United States Patent [19]

Lloyd-Williams et al.

[11] Patent Number: 4,765,804
[45] Date of Patent: Aug. 23, 1988

[54] PSA PROCESS AND APPARATUS EMPLOYING GASEOUS DIFFUSION BARRIERS

[75] Inventors: Andrew Lloyd-Williams, High Bridge; Donald L. MacLean, Annandale; Ravi Jain, North Plainfield; Steven L. Lerner, Berkeley Heights, all of N.J.

[73] Assignee: The BOC Group, Inc., Montvale, N.J.

[21] Appl. No.: 97,776

[22] Filed: Sep. 17, 1987

Related U.S. Application Data

[63] Continuation of Ser. No. 914,097, Oct. 1, 1986, abandoned.

[51] Int. Cl.$^4$ ...................... B01D 53/04; B01D 53/22
[52] U.S. Cl. .......................................... 55/16; 55/18; 55/25; 55/68; 55/158; 55/179; 55/389
[58] Field of Search ............... 55/16, 18, 25, 26, 68, 55/75, 158, 179, 389, 58, 62; 62/18

[56] References Cited

U.S. PATENT DOCUMENTS

| | | | |
|---|---|---|---|
| 4,654,063 | 3/1987 | Auvil et al. | 55/158 X |
| 4,701,187 | 10/1987 | Choe et al. | 55/58 X |
| 4,717,407 | 1/1988 | Choe et al. | 55/158 X |

Primary Examiner—Robert Spitzer
Attorney, Agent, or Firm—R. Hain Swope; Larry R. Cassett

[57] ABSTRACT

There is disclosed an improved PSA process and apparatus for gas enrichment wherein the pressure levels of the vent gas stream and/or product stream are used to drive gaseous diffusion cells to produce a feed gas stream and/or a purge gas stream to be used in the pressure swing adsorption process to increase on-line production time and to utilize the waste pressure energy thereby decreasing energy requirements per unit of production.

20 Claims, 7 Drawing Sheets

VENT PRESSURE AS A FUNCTION OF TIME FOR A NITROGEN PSA.

OXYGEN CONCENTRATION AS A FUNCTION OF TIME IN A NITROGEN PSA VENT

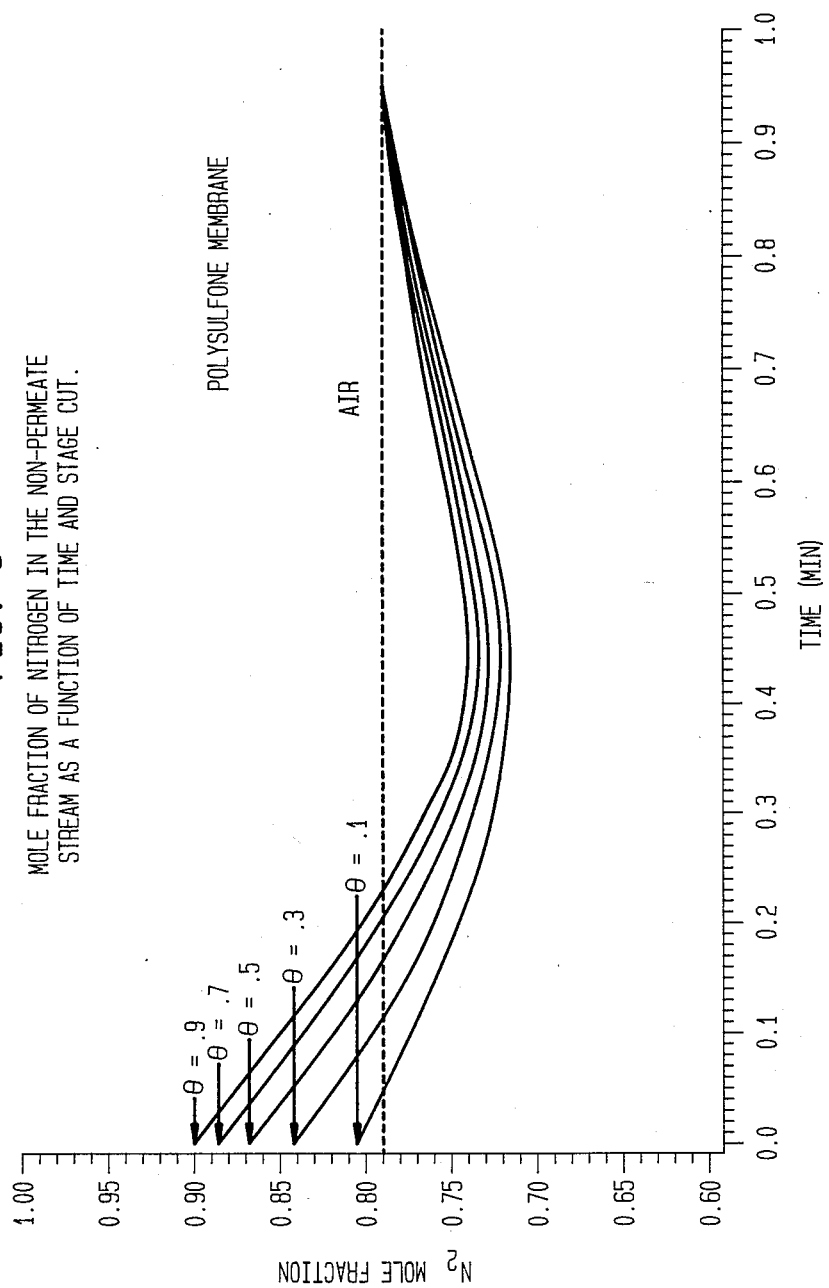

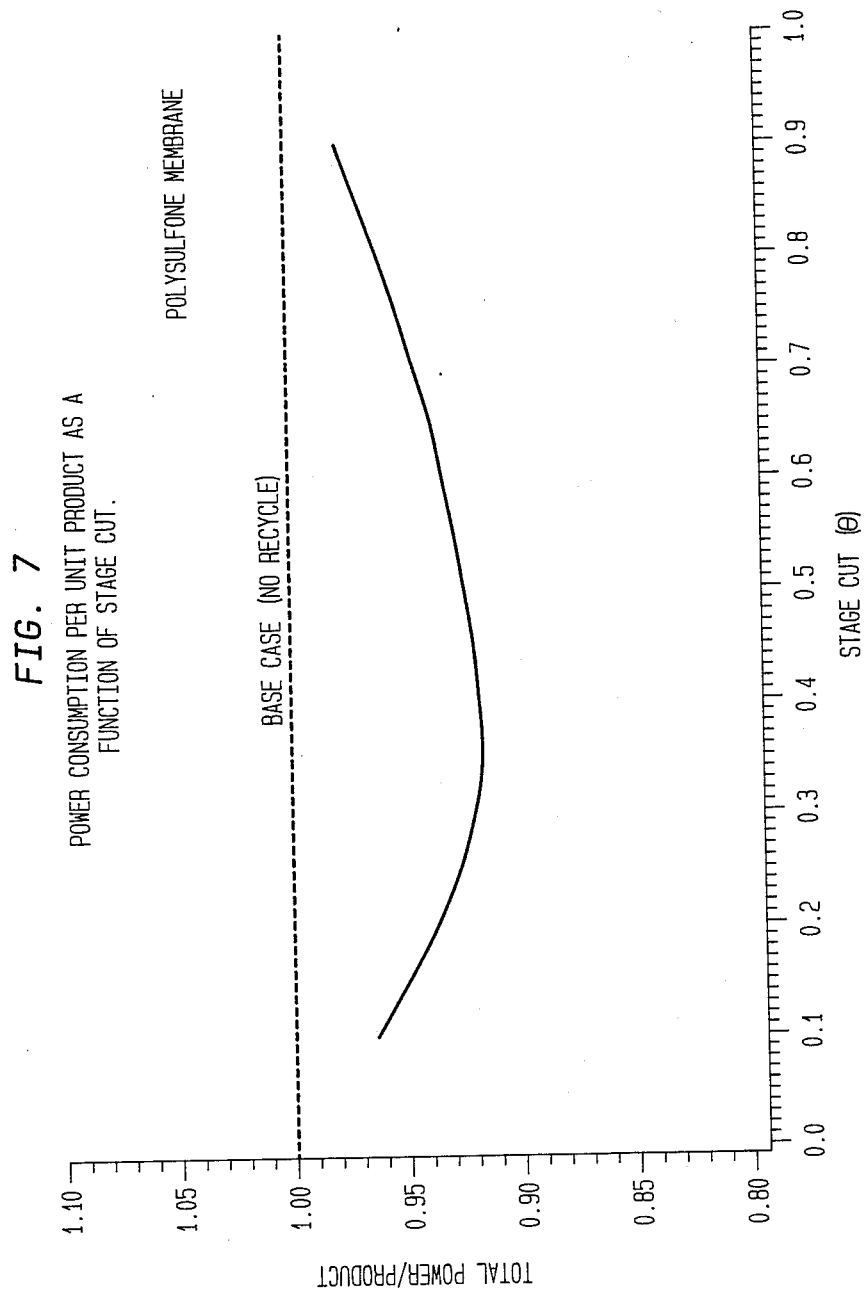

PSA PROCESS AND APPARATUS EMPLOYING GASEOUS DIFFUSION BARRIERS

This is a continuation of application Ser. No. 914,097, filed Oct. 1, 1986 now abandoned.

BACKGROUND OF THE INVENTION (1) Field of the Invention

This invention relates to gas enrichment utilizing pressure swing adsorption techniques, and more particularly to an improved pressure swing adsorption process and apparatus including gaseous diffusion barriers for gas enrichment.

(2) Description of the Prior Art

The use of adsorption techniques to separate a gaseous component from a gaseous stream initially was developed for the removal of carbon dioxide and water from air. The principles of gas adsorption were further refined to processes for gas enrichment of hydrogen, helium, argon, carbon monoxide, carbon dioxide, nitrous oxide, oxygen and nitrogen. Still further refinements using at least two adsorption vessels in a cycling pressurized relationship have resulted in an adsorption technique for gas enrichment commonly referred to as pressure swing adsorption (PSA).

A conventional PSA process for enriching a gas, such as nitrogen from air, employs at least two adsorption beds filled with carbon molecular sieve material, each subjected to two or more, generally four distinct processing steps in each cycle. In a first step of the cycle, one adsorption bed is pressurized with concomitant nitrogen production while the other bed is regenerated, such as by venting. The adsorption bed may also be regenerated with countercurrent flow of product-quality gas (referred to as "purge"). In a second step, sometimes referred to as pressure equalization, the adsorption beds are brought to an intermediate pressure by interconnection of the adsorption beds. In a third step of the cycle, the first adsorption bed is regenerated following the procedure used for the second bed while the second bed is put into production. The last step of the cycle is pressure equalization between the beds. During such pressure swings, pressure conditions in the adsorption beds vary between about 15 psia to 120 psig in a process employing carbon molecular sieves for nitrogen production and somewhat lower pressure ranges in processes employing crystalline zeolites for producing oxygen.

The use of an oxygen separation membrane in a pressure swing adsorption process is disclosed in Japanese Patent Application No. Sho 51(1982)-31576, filed Feb. 27, 1982 wherein oxygen is produced by PSA techniques in adsorption columns filled with zeolite particles and wherein during the purge cycle of each adsorption column an oxygen purge gas is passed therethrough. The oxygen purge gas is obtained as a gaseous permeate stream from a gas separation membrane into which an enriched oxygen stream is introduced during a production cycle of each of the adsorption columns.

OBJECTS OF THE INVENTION

An object of the present invention is to provide an improved PSA process and apparatus of reduced energy requirements.

Another object of the present invention is to provide an improved PSA process and apparatus permitting of longer cycling times.

A further object of the present invention is to provide an improved PSA process and apparatus capable of producing high purity product for longer periods of time.

A still further object of the present invention is to provide an improved PSA process and apparatus advantageously utilizing the pressure levels of vent streams.

SUMMARY OF THE INVENTION

These and other objects of the present invention are achieved in an improved PSA process and apparatus for gas enrichment wherein the pressure levels of the vent gas stream and/or product stream are used to drive gaseous diffusion cells to produce a feed gas stream and/or a purge gas stream to be used in the pressure swing adsorption process to increase on-line production time and to utilize waste pressure energy, thereby decreasing energy requirements per unit of production.

BRIEF DESCRIPTION OF THE DRAWINGS

A better understanding of the present invention as well as other objects and advantages thereof will become apparent upon consideration of the detailed description thereof, especially when taken with the accompanying drawings, wherein:

FIG. 6 is a graph showing a typical mole fraction of nitrogen in the non-permeate stream as a function of time and stage cut according to the embodiment of FIG. 3 of the present invention; and FIG. 7 is a graph showing power consumption per unit product as a function of stage cut according to the embodiment of FIG. 3 of the present invention.

DETAILED DESCRIPTION OF THE INVENTION

Figure 1:
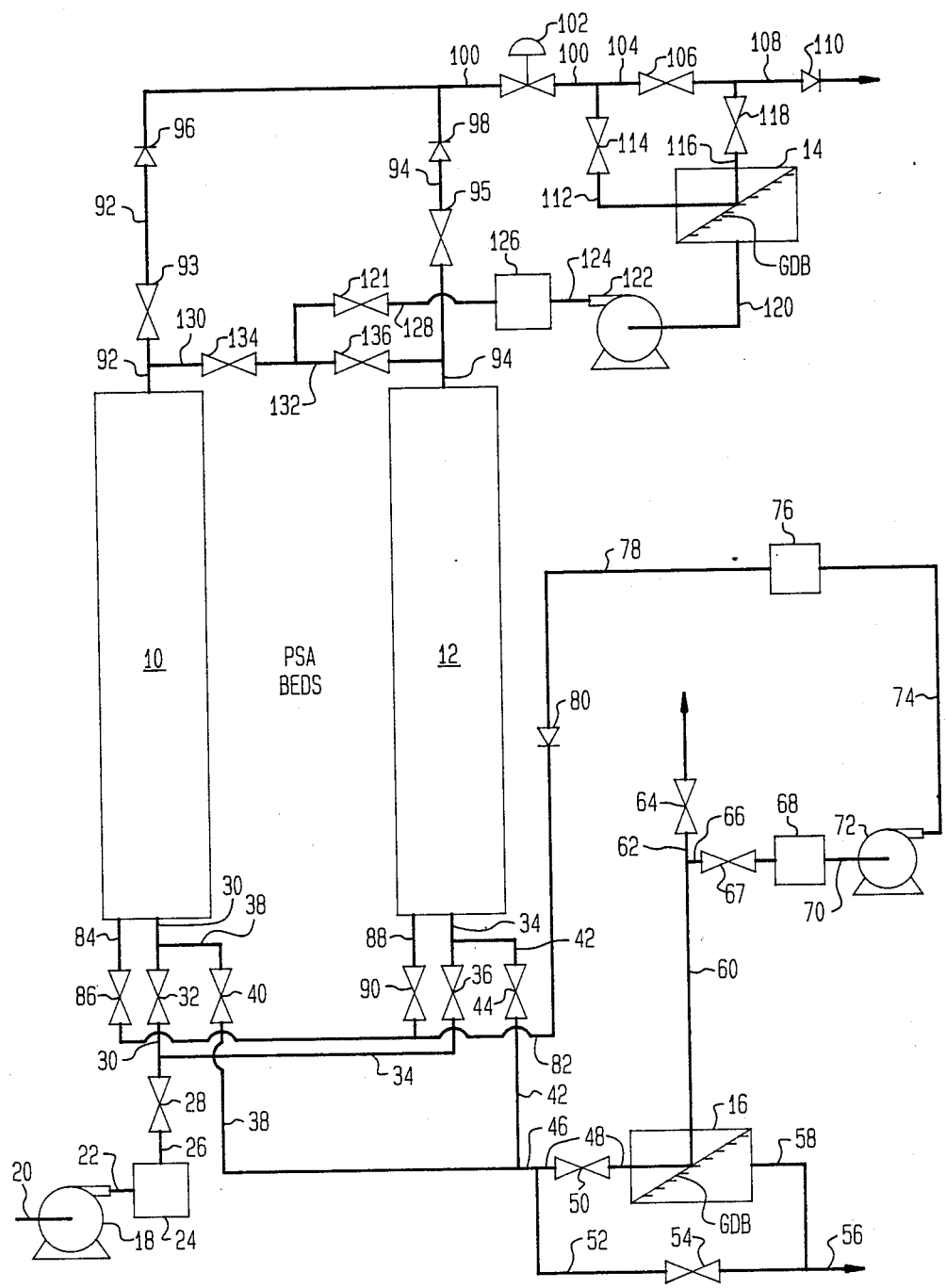
FIG. 1 is a schematic flow diagram of a preferred embodiment of the present invention.

To facilitate an understanding of the present invention; certain valving, piping and instrumentation assemblies are not illustrated in the drawings; however, it will be understood that such additional valving, piping and instrumentation assemblies are provided consistent with accepted practices in the art. The present invention will be described in the context of nitrogen enrichment of air using an adsorbent bed of carbon molecular sieves, although it will be understood by one skilled in the art that the process and apparatus of the present invention are applicable to gas enrichment, per se, using pressure swing adsorption techniques.

Referring now to FIG. 1, there is illustrated a schematic flow diagram of the process and apparatus of the present invention including adsorption vessels 10 and 12, and upper and lower gas diffusion vessels 14 and 16. The adsorption vessels 10 and 12 are filled with an appropriate adsorption material, such as the aforementioned carbon molecular sieves. The upper and lower gas diffusion vessels 14 and 16 are provided with suitable gaseous diffusion barriers (GDB), as more fully hereinafter discussed.

The process and apparatus of the present invention is provided with a feed compressor 18 including an inlet conduit 20 on the suction side thereof in fluid communication with a surge tank 24. The surge tank 24 is provided with a conduit 26 under the control of valve 28 connected to a conduit 30 under the control of valve 32 with the lower portion of the adsorption vessel 10 and to a conduit 34 under the control of valve 36 with the lower portion of the adsorption vessel 12.

The conduits 30 and 34 connected to the lower portion of the adsorption vessels 10 and 12 are connected by conduit 38 under the control of the valve 40 and conduit 42 under the control of valve 44, respectively to a conduit 46. The conduit 46 is connected by a conduit 48 under the control of valve 50 with the lower gas diffusion vessel 16 and by a conduit 52 under the control of valve 54 to a vent conduit 56.

The lower gas diffusion vessel 16 on the permeate side is provided with a conduit 58 connected to the vent conduit 56 and on the non-permeate side is provided with a conduit 60. The conduit 60 is connected to a conduit 62 under the control of valve 64 and to a conduit 66 under the control of valve 67 to a holding tank 68. The holding tank 68 is provided with a conduit 70 connected to the suction side of a compressor 72 with the discharge side thereof being connected by a conduit 74 to a surge tank 76. The compressor 72 and related surge tank 76 are optionally provided to permit process flexibility. The holding tank 76 is provided with an outlet conduit 78 including a one-way valve 80 connected to a conduit 82. The conduit 82 is connected to the lower portion of adsorption vessel 10 by a conduit 84 under the control of valve 86 and to the lower portion of adsorption vessel 12 by a conduit 88 under the control of valve 90, as more fully hereinafter described.

The adsorption vessels 10 and 12 are provided with upper conduits 92 and 94, respectively, under the control of valves 93 and 95 and including one-way check valves 96 and 98, respectively, connected to a conduit 100. The conduit 100 under the control of valve 102 is connected to a conduit 104 under the control of valve 106 with a product conduit 108 including one-way valve 110. The conduit 100 is connected by a conduit 112 under the control of valve 14 to the upper gas diffusion vessel 14. The upper gas diffusion vessel 14 is provided on the non-permeate side with a conduit 116 under the control of valve 118 connected to the product conduit 108, and is provided on the permeate side with a conduit 120 in fluid communication with the suction side of a compressor 122. The discharge side of the compressor 122 is connected by a conduit 124 to a holding tank 126 having a conduit 128 under the control of valve 121 and connected to conduits 130 and 132 under the control of valves 134 and 136 with upper conduits 92 and 94, respectively, of the adsorption vessels 10 and 12. Generally, the compressor 122 and associated holding or surge tank 126 is optionally provided for process flexibility.

The upper and lower gas diffusion vessels 14 and 16 are commercially available vessels, such as from UOP Fluid Systems (a Division of Allied-Signal), and provided with a suitable gaseous diffusion barrier which uses a silicone-rubber membrane, or from Monsanto Chemical Company which uses a polysulfone membrane. The membrane used in the cells permits gaseous molecular oxygen to pass through the membranes faster than gaseous molecular nitrogen.

In one aspect of the present invention, the pressurized gas stream withdrawn from an adsorption column during regeneration following pressure equalization is introduced into the lower gaseous diffusion vessel 16 wherein there is formed a non-permeate gas stream relatively depleted in the adsorbate (or oxygen) and at an elevated pressure and a permeate gaseous stream of a higher level of the adsorbate which is vented. The non-permeate gas stream at an elevated pressure may be used to directly repressurize an adsorption bed, to repressurize an adsorption bed after recompression, to repressurize an adsorption bed following partial repressurization by equalization, or to be used as a feed gas stream, as more fully hereinafter discussed.

In another aspect of the present invention, a portion of the gas enriched product stream, as breakthrough is approached and product purity level falls off, is introduced into the upper gaseous diffusion vessel to form a non-permeate stream, i.e. a gaseous stream of a purity consistent with product design criteria, and a permeate stream to be used for purge and/or backfill, as more fully hereinafter discussed. The use of both the upper and lower gaseous diffusion assemblies may be efficaciously integrated into existing PSA plants.

In operation, let it be assumed that the apparatus is in operation in a PSA process for producing high purity nitrogen, e.g. 99.9% nitrogen at a pressure of from 60 to 150 psig, wherein the adsorption vessel 10 has been desorbed and is ready for production following pressurization, whereas the adsorption vessel 12 requires regeneration, and prior to that pressure equalization or balancing has been effected between the adsorption vessels 10 and 12. In describing the operation of the following steps, only the valves opened during each step are mentioned, it being understood that the remaining valves are closed. In this condition, valves 28, 32, 44, 50, 67, 93, 102 and 106 are opened.

For pressurization of adsorption vessel 10 and for production, air at ambient temperature in inlet conduit 20 is compressed in compressor 18 to a pressure of from 65 to 155 psig and passed by conduit 22 to the surge tank 24 and thence by conduits 26 and 30 to the lower portion of the adsorption vessel 10. The compressed air is introduced at a pressure of about 55 to 155 psig into adsorption vessel 10 wherein oxygen is selectively adsorbed therein to form a nitrogen-enriched gaseous stream withdrawn from adsorption vessel 10 by upper conduit 92 and passed at a pressure of from 60 to 150 psig by conduits 100, 104 and 108 to product storage or user equipment (not shown).

The flow of compressed air to adsorption vessel 10 is continued until a point is reached where the level of oxygen in the nitrogen product gaseous stream reaches a predetermined threshold value unacceptable for product usage. For example, the average oxygen content of the nitrogen-enriched product stream may be 1000 ppmv $O_2$ whereupon a predetermined threshold value may be 1200 ppmv $O_2$.

At the point of reaching such a predetermined threshold value, the nitrogen-enriched gaseous stream (or "tail-end" product) in conduit 100 is purified in the upper gaseous diffusion vessel 14 by closing valve 106 to provide a non-permeate gas stream of acceptable purity withdrawn by conduit 116 and passed to product conduit 108. The permeate stream (the stream permeating the diffusion cell), slightly enriched in oxygen and at a lower pressure level, is passed by conduit 120 under the control of valves 121 and 136 at a pressure level of from 15 to 50 psig to the adsorption vessel 12 as a purge gas or as backfill for the adsorption bed undergoing regeneration. In this condition, valves 28, 32, 44, 54, 93, 102, 114, 118, 121 and 136 are open. The compressor 122 and associated holding tank 126 are optionally provided as hereinabove discussed. The flow of gaseous product in conduit 100, having a level of impurity higher than threshold value, is continued to the upper gas diffusion vessel 14 for a period of time where further increase in the concentration of oxygen warrants shutdown of adsorption vessel 10 and the regeneration thereof.

At the initiation of pressurization of the adsorption vessel 10 prior to production of an enriched gaseous stream the adsorption vessel 12 has undergone pressure equalization or pressure balancing and is concomitantly readied for the blowdown cycle. During this condition, valves 28, 32, 44, 50 and 67 are opened to allow pressurization of adsorption vessel 10 and to permit a flow of gas from the adsorption vessel 12 through the conduits 34, 42, 46 and 48 into the gaseous diffusion vessel 16 including a suitable gaseous diffusion barrier (GDB). In the gaseous diffusion vessel 16, oxygen readily passes through the gas-permeable membrane (GM). An oxygen-enriched gaseous stream (permeate) is withdrawn from the gas diffusion cell 16 by conduit 58 and passed via conduit 56 to vent. The non-permeate gaseous stream formed in the gaseous diffusion vessel 16 is available at a pressure of from at least about 15 to a pressure range of from 15 to 75 psig, as more fully hereinafter discussed. Upon reaching a predetermined concentration level of $N_2$, e.g. 79%, or alternately determined by a pressure level of from 15 to 30 psig in the non-permeate stream, generally as determined by cycle time versus gas analysis, the valve 50 in conduit 48 is closed and the valve 54 in conduit 52 is opened to permit the gas stream in conduit 46 to be passed to vent via conduit 56.

As hereinabove discussed, the permeate stream and non-permeate gaseous stream formed in the upper and lower gas diffusion cells 14 and 16 may be used in diverse ways to improve the process of gas enrichment utilizing pressure swing adsorption techniques. With regard to the use of the lower gaseous diffusion cell 16, the non-permeate stream in conduit 60 may be used to repressurize via conduit 62 one or more regenerated beds (not shown) in a multi-bed PSA system which is generally effected concurrently with venting but before pressure equalization. Depending on the cycling times of such regenerated beds, the non-permeate stream may be passed to a holding tank 68 prior to introduction into such regenerated beds during repressurization. Still further, in a multi-bed PSA system, i.e two or more adsorption vessels, each non-permeate stream in conduit 66 may be compressed in compressor 72 and may be passed by conduit 82, in lieu of compressed air from holding tank 24 for the initial stage of product delivery. In a multi-bed PSA system, i.e. two or more adsorption vessels, such non-permeate stream may be passed in lieu of compressed air for the initial stage of product delivery prior to admission of compressed air for the repressurization step.

Figure 2:
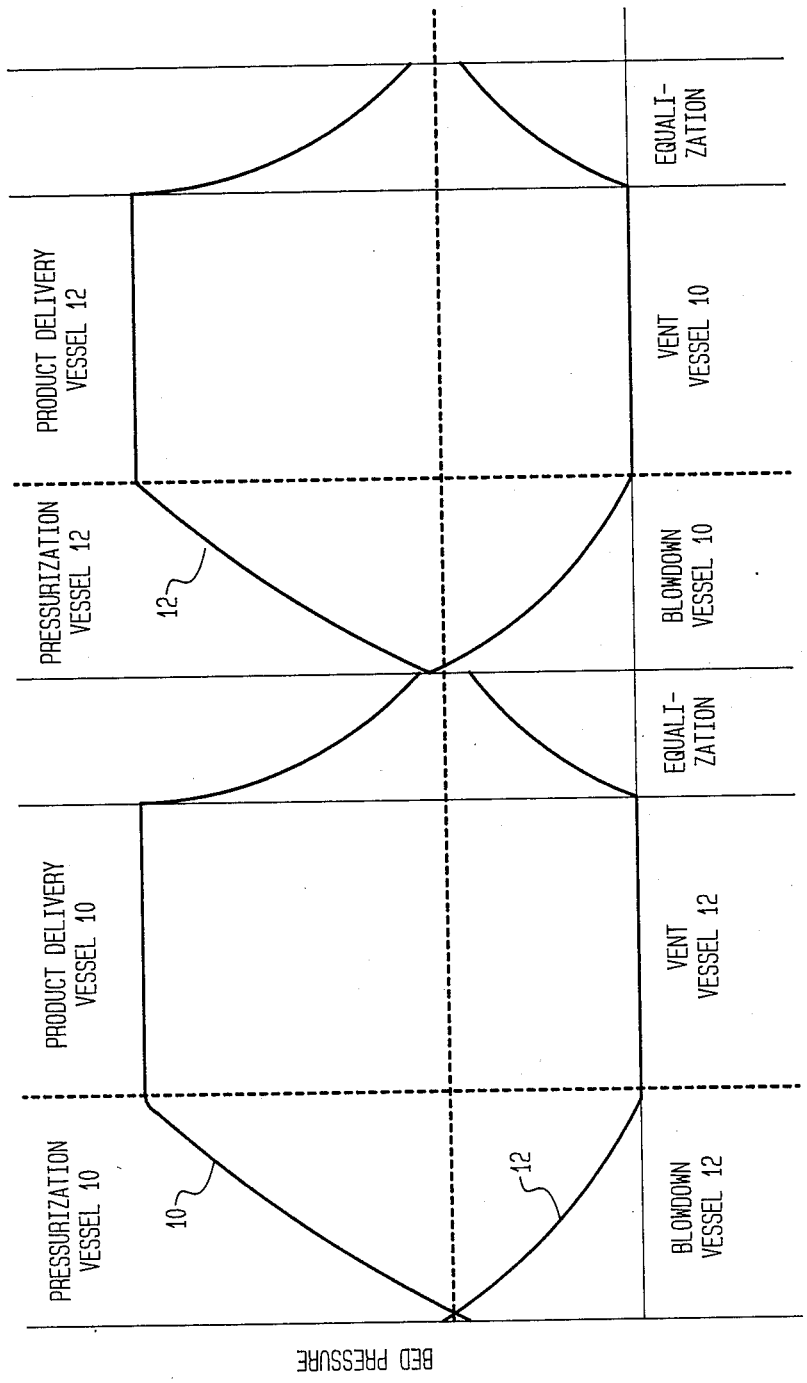
FIG. 2 is a pressure profile of the adsorbent vessels for a complete cycle of a somewhat standard PSA process.

As illustrated in FIG. 2 in a normal PSA operation, at the end of product delivery from adsorption vessel 10, the adsorption vessel 12 will have undergone regeneration including blowdown and venting at which time the adsorption vessel 12 is readied for production and the adsorption vessel 10 is readied for regeneration. At such time, valves 32, 36, 134 and 136 are opened to effect pressure equalization between the adsorption vessels 10 and 12.

The step of pressure equalization is effected for a time sufficient for such purpose, generally of from 2 to 20 seconds depending on the volume and type of the bed of adsorption material in the adsorption vessels 10 and 12. The step of pressure equalization for the PSA process of this invention is the same as in a normal PSA process; however, it is effected after processing the vent from the adsorption vessel undergoing regeneration with the lower gaseous diffusion cell and after processing tail-end product from the in production adsorption vessel with the upper gaseous diffusion cell.

At a preselect time in the operational cycle, adsorption vessel 12 is placed in a nitrogen production mode and the adsorption vessel 10 into a regeneration mode. In this condition, valves 28, 36, 40, 50, 67, 95, 102 and 106 are opened. Accordingly, compressed air in conduit 22 is now passed through conduits 26 and 34 to the adsorption vessel 12 to form a nitrogen-enriched product gaseous stream which is withdrawn from the adsorption vessel 12 through conduit 94 and passed by conduits 100, 104 and 108 to product storage. Regeneration of the bed of adsorbent material in adsorption vessel 10, i.e. blowdown and venting are effected in like manner to that of the bed of adsorption material in adsorption vessel 12. During regeneration, a gaseous stream is withdrawn from adsorption vessel 10 by conduit 38 and is passed through conduits 46 and 48 under the control of valve 50 to lower diffusion cell 16 as hereinabove described.

At the completion of regeneration of the bed of adsorption material in the adsorption vessel 10 and the completion of product delivery from the adsorption vessel 12 including the purification of the tail-end product in the upper gaseous diffusion cell 14, the valves 32, 36, 134 and 136 are opened to initiate and permit the step of pressure equalization.

In accordance with one aspect of the present invention as hereinabove discussed, the gaseous stream withdrawn from an adsorption vessel in the conduit 46 at the inception of blowdown is at an elevated pressure of from 40 to 75 psig and is passed by conduit 48 under the control of valve 50 to the gaseous diffusion vessel 16, generally to a point where the pressure in the conduit 46 reaches about 15 psig. Upon reaching such pressure, the gaseous stream is vented to atmosphere by closing valve 50 and opening valve 54 to permit gaseous flow through conduit 52.

EXAMPLES

The following examples are illustrative of the process of the present invention, and it is to be understood that the scope of the invention is not to be limited thereby.

EXAMPLE I

The PSA vent, after pressure equalization between beds, is passed through the lower diffusion cell (polysulfone membrane). Referring to FIG. 1, the nitrogen-enriched non-permeate stream from the lower diffusion cell is sent to the holding tank 68 and is then compressed to the feed pressure in compressor 72. The compressed gas in the holding tank 76 is introduced as feed to the adsorption vessels 10 or 12 during part of the production cycle.

Figure 3:
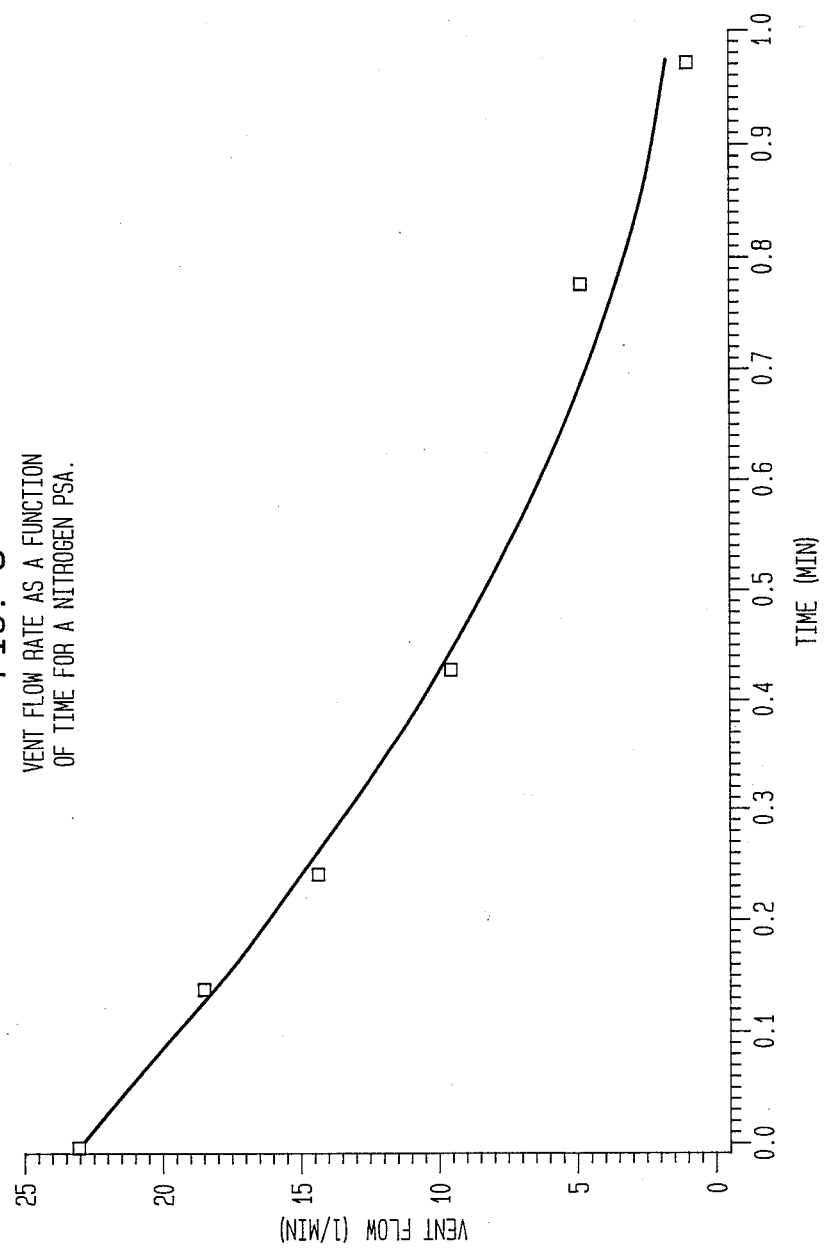
FIG. 3 is a graph showing a typical vent flow rate as a function of time for a nitrogen PSA according to one embodiment of the present invention.
Figure 4:
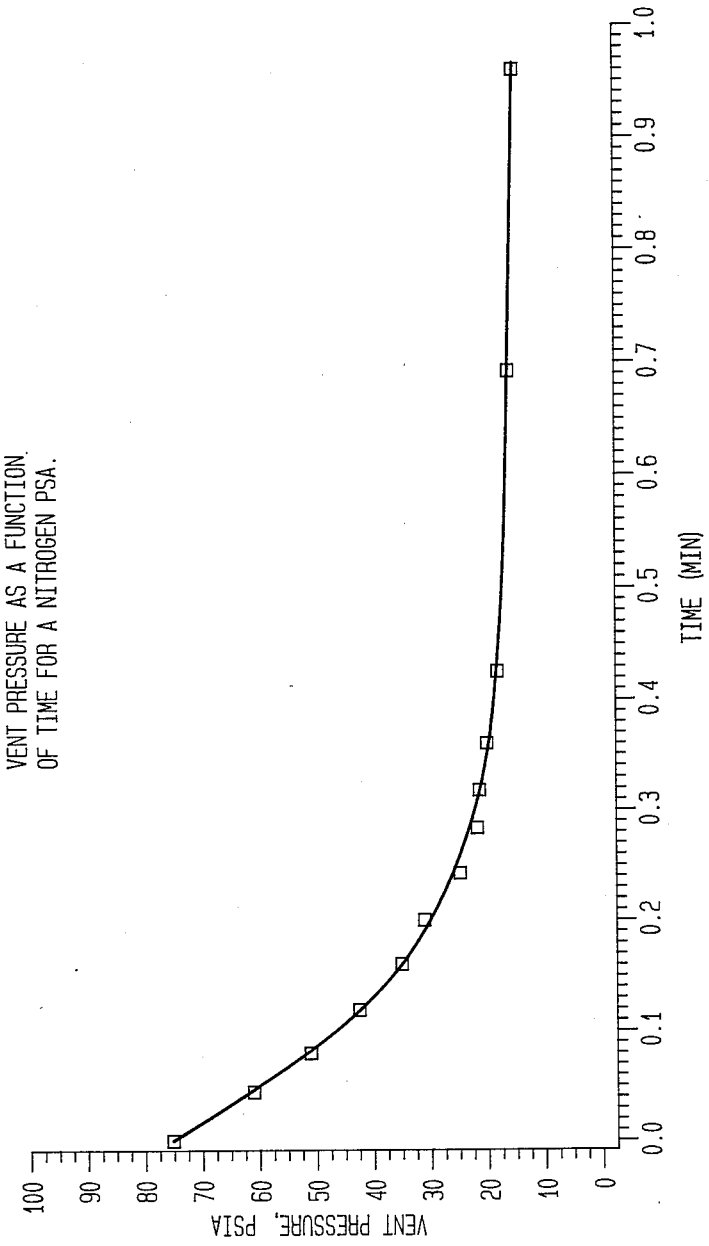
FIG. 4 is a graph showing a typical vent pressure as a function of time for a nitrogen PSA according to the embodiment of FIG. 3 of the present invention.
Figure 5:
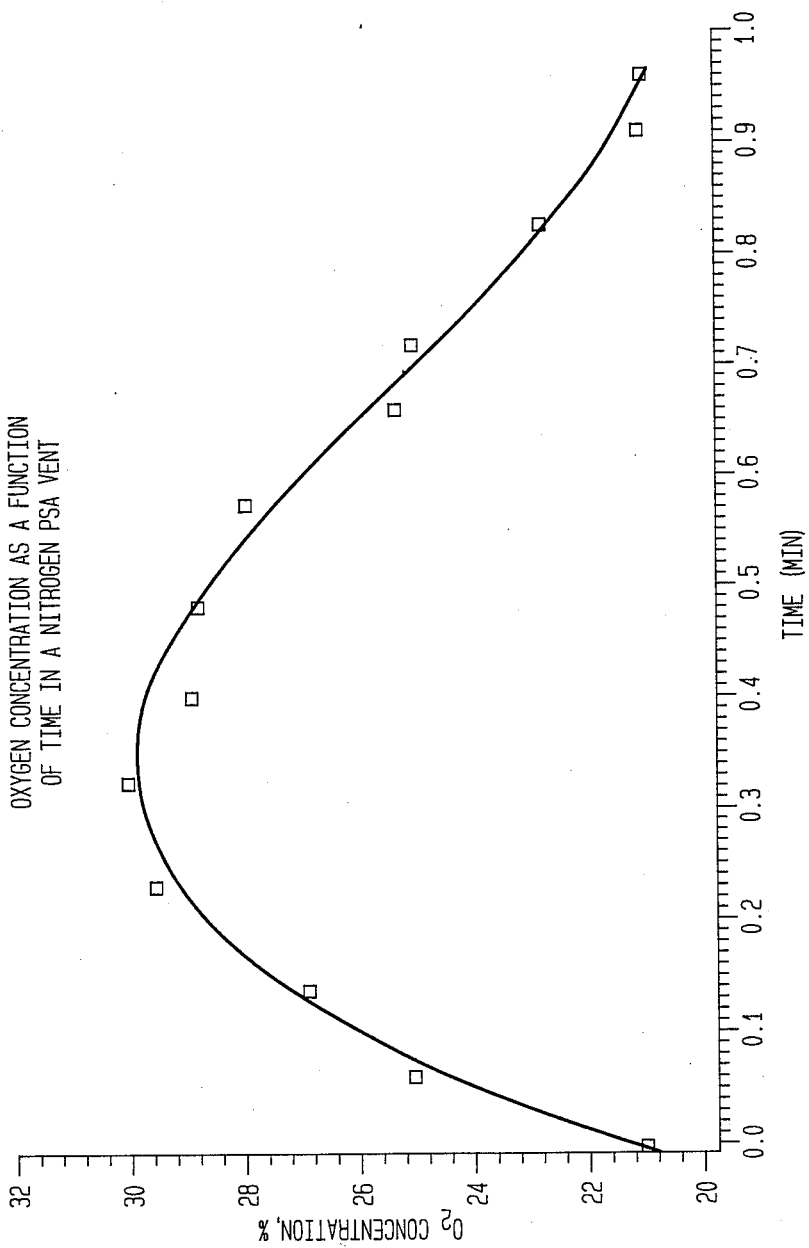
FIG. 5 is a graph showing a typical oxygen concentration as a function of time in a nitrogen PSA according to the embodiment of FIG. 3 of the present invention.

FIGS. 3 to 5 illustrate vent flowrate, vent pressure, and vent oxygen concentration as a function of time for a nitrogen PSA employing BF (Bergbau-Forschung, West Germany) carbon molecular sieve and operating on a 2 min. full cycle. The operating pressure is 120 psig and the profiles shown in FIGS. 3 to 5 are for the bed undergoing regeneration by venting. The nitrogen concentration profiles for polysulfone membrane, as a function of stage cut (fraction of feed permeating the membrane), are shown in FIG. 6. The energy required to compress the fraction of non-permeate stream with a nitrogen concentration above 79% to feed pressure (120 psig) was calculated as a function of stage cut.

Significant energy savings are realized since the non-permeate stream requires relatively smaller compression to be raised to feed pressure because of it being at a pressure higher than atmospheric, while fresh feed has to be compressed to operating pressure starting at atmospheric pressure. FIG. 7 shows relative power requirements to produce a unit amount of product in the absence of a diffusion cell, versus a diffusion cell containing polysulfone membrane. The optimum performance is obtained for a stage cut of about 50% and for this case about 8.5% energy savings are possible for polysulfone membranes and realized by use of a lower gaseous diffusion cell to provide a portion of the gaseous feed.

EXAMPLE II

The following example illustrates the cycling time for a PSA process using a non-permeate gas stream formed in the gaseous diffusion vessel 16 to pressurize an adsorption fed prior to pressure equalization (Valves—FIG. 1):

| Step | Vessel 10 | Vessel 12 | Valves Open | Typical Times (sec.) |
|---|---|---|---|---|
| 1 | Pressurize with fresh feed | Vent through lower diffusion cell | 28, 32, 44, 50, 67 | 10 |
| 2 | Produce N$_2$ product | Vent through lower diffusion cell | 28, 32, 44, 50, 67, 93, 102, 106 | 30 |
| 3 | Produce N$_2$ product | Vent directly to atmosphere | 28, 32, 44, 54, 93, 102, 106 | 70 |
| 4 | Produce N$_2$ product | Pressurize with gas from lower diffusion cell | 28, 32, 90, 93, 102, 106 | 5 |
| 5 | Pressure equalization with Vessel 12 | Pressure equalization with Vessel 10 | 32, 36, 134, 136 | 5 |
| 6 | Vent through lower diffusion cell | Pressurize with fresh feed | 28, 36, 40, 50, 67 | 10 |
| 7 | Vent through lower diffusion cell | Produce N$_2$ product | 28, 36, 40, 50, 67, 95, 102, 106 | 30 |
| 8 | Vent directly to atmosphere | Produce N$_2$ product | 28, 36, 40, 50, 95, 102, 106 | 70 |
| 9 | Pressurize with gas from lower diffusion cell | Produce N$_2$ product | 28, 36, 86, 95, 102, 106 | 5 |
| 10 | Pressure equalization with Vessel 12 | Pressure equalization with Vessel 10 | 32, 36, 134, 136 | 5 |
| | | | | 4 min./cycle |

EXAMPLE III

The following example illustrates the cycling times for a nitrogen PSA process in which a permeate stream from the gaseous diffusion vessel 14 is used to purge one of the adsorption beds (Valves—FIG. 1):

| Step | Vessel 10 | Vessel 12 | Valves Open | Typical Times (sec.) |
|---|---|---|---|---|
| 1 | Pressurize with fresh feed | Vent directly to atmosphere | 28, 32, 44, 54 | 10 |
| 2 | Produce N$_2$ product | Vent directly to atmosphere | 28, 32, 44, 54, 93, 102, 106 | 100 |
| 3 | Purify product with upper diffusion cell, provide purge for Vessel 12 | Purge Vessel 12 with permeate from upper diffusion cell | 28, 32, 44, 54, 93, 102, 114, 116, 121, 136 | 35 |
| 4 | Pressure equalization with Vessel 12 | Pressure equalization with Vessel 10 | 32, 36, 134, 136 | 5 |
| 5 | Vent directly to atmosphere | Pressurize with fresh feed | 28, 36, 40, 54 | 10 |
| 6 | Vent directly to atmosphere | Produce N$_2$ product | 28, 36, 40, 54, 95, 102, 106 | 100 |
| 7 | Purge with permeate from upper diffusion | Purify product with upper diffusion cell, | 28, 36, 40, 54, 95, 102, | 35 |

-continued

| Step | Vessel 10 | Vessel 12 | Valves Open | Typical Times (sec.) |
|---|---|---|---|---|
|  | cell | provide purge for Vessel 10 | 114, 116, 121, 134 |  |
| 8 | Pressure equalization with Vessel 12 | Pressure equalization with Vessel 10 | 32, 36, 134, 136 | 5 |
|  |  |  |  | 5 min./cycle |

EXAMPLE IV

The following example illustrates the cycling time for a PSA process using the combined processing steps as disclosed in Examples II and III (Valves—FIG. 1):

| Step | Vessel 10 | Vessel 12 | Valves Open | Typical Times (sec.) |
|---|---|---|---|---|
| 1 | Pressurize with fresh feed | Vent through lower diffusion cell | 28, 32, 44, 50, 67 | 10 |
| 2 | Produce N$_2$ product | Vent through lower diffusion cell | 28, 32, 44, 50, 67, 93, 102, 106 | 30 |
| 3 | Produce N$_2$ product | Vent directly to atmosphere | 28, 32, 44, 54, 93, 102, 106 | 70 |
| 4 | Purify product with upper diffusion cell, provide purge for Vessel 12 | Purge Vessel 12 with permeate from upper diffusion cell | 28, 32, 44, 54, 93, 102, 114, 116, 121, 136 | 30 |
| 5 |  | Pressurize with gas from lower diffusion cell | 90 | 5 |
| 6 | Pressure equalization with Vessel 12 | Pressure equalization with Vessel 10 | 32, 36, 134, 136 | 5 |
| 7 | Vent through lower diffusion cell | Pressurize with fresh feed | 28, 36, 40, 50, 67 | 10 |
| 8 | Vent through lower diffusion cell | Produce N$_2$ product | 28, 36, 40, 50, 67, 95, 102, 106 | 30 |
| 9 | Vent directly to atmosphere | Produce N$_2$ product | 28, 36, 40, 54, 95, 102, 106 | 70 |
| 10 | Purge with permeate from upper diffusion cell | Purify product with upper diffusion cell, provide purge for Vessel 10 | 28, 36, 40, 54, 95, 102, 114, 116, 121, 134 | 30 |
| 11 | Pressurize with gas from lower diffusion cell |  | 86 | 5 |
| 12 | Pressure equalization with Vessel 12 | Pressure equalization with Vessel 10 | 32, 36, 134, 136 | 5 |
|  |  |  |  | 5 min./cycle |

By using the process of the present invention as directed to the use of gaseous diffusion vessels the result is a reduction in energy requirements of from 5 to 15% per unit of product depending on the type of membrane material used in the diffusion cells.

The present invention has been described in the context of PSA processing technology in the production of a nitrogen-enriched product stream; however, it will be understood by one of ordinary skill in that art that the present invention is applicable to gas enrichment technology, per se, using pressure swing adsorption techniques.

While the present invention has been described in connection with an exemplary embodiment thereof, it will be understood that many modifications will be apparent to those of ordinary skill in the art, and that this application is intended to cover any adaptations or variations thereof. Therefore, it is manifestly intended that this invention be only limited by the claims and the equivalents thereof.

What is claimed:

1. In a process for selective enrichment of a component of a compressed gaseous mixture wherein at least two beds of adsorption material are cycled through adsorption stages and desorption stages to produce in said adsorption stages a product gaseous stream enriched in said component, the improvement wherein a gaseous stream withdrawn from a bed of adsorption material undergoing desorption is introduced directly into a gas diffusion zone, thereby forming a permeate stream and an nonpermeate stream, one of which is enriched in said component and recovering said enriched stream.

2. The process as defined in claim 1 wherein said product gaseous stream is obtained from said adsorption zone undergoing desorption following pressure equalization between said beds of adsorption material.

3. The process as defined in claim 1, wherein said component is nitrogen, the stream formed in the gas diffusion zone which is enriched therein is the nonpermeate stream and introduction of said gas stream to said gas diffusion zone is discontinued upon reaching a pressure level of 15 psig or upon reaching a nitrogen concentration of less than 79% in said nonpermeate stream.

4. The process as defined in claim 3 wherein the permeate stream formed in said gas diffusion zone is vented to atmosphere.

5. The process as defined in claim 1, wherein said enriched gaseous stream is introduced into an adsorption bed after desorption therein.

6. The process as defined in claim 5 wherein introduction of said gaseous enriched stream into said adsorption bed is effected before pressure equalization with another adsorption bed.

7. The process as defined in claim 1, wherein said enriched gaseous stream is compressed and introduced into an adsorption bed as a fresh feed stream thereto.

8. In a process for selective enrichment of a component of a compressed gaseous mixture wherein at least two beds of adsorption material are cycled through adsorption stages and desorption stages to produce in said adsorption stages a product gaseous stream enriched in said component, the improvement wherein a gaseous stream withdrawn from a bed of adsorption material undergoing desorption is introduced directly into a gas diffusion zone, thereby forming a permeate stream and a nonpermeate stream, one of which is enriched in said component, recovering said enriched stream for recycle to said process, and wherein, upon reaching a predetermined threshold concentration of a component of said gaseous mixture other than said enriched component in the product gaseous stream withdrawn from an adsorption bed during adsorption, the gaseous product stream is introduced into a gas diffusion zone thereby forming a permeate stream and a nonpermeate stream in one of which said enriched component is further enriched relative to said product stream, and recovering said further enriched stream.

9. The process as defined in claim 8 wherein said gaseous stream is obtained from said adsorption zone undergoing desorption following pressure equalization between said beds of adsorption material.

10. The process as defined in claim 8, wherein said component is nitrogen, the stream formed in the gas diffusion zone which is enriched there is the nonpermeate stream and introduction of said gas stream withdrawn from a bed of adsorption material undergoing desorption to said gaseous diffusion zone is discontinued upon reaching a pressure level of 15 psig or upon reaching a nitrogen concentration of less than 79% in said nonpermeate stream.

11. The process as defined in claim 8, wherein the enriched gaseous stream withdrawn from a bed of adsorption material and subsequently recovered from said gas diffusion zone is introduced into an adsorption bed after desorption thereof.

12. The process as defined in claim 11 wherein introduction of said gaseous enriched stream into said adsorption bed is effected prior to pressure equalization with another adsorption bed.

13. The process as defined in claim 8, wherein the enriched gaseous stream withdrawn from a bed of adsorption material and subsequently recovered from a gas diffusion zone is compressed and introduced into an adsorption bed as a fresh feed stream thereto.

14. In a process for selective enrichment of a component of a compressed gaseous mixture wherein at least two beds of adsorption material are cycled through adsorption stages and desorption stages to produce in said adsorption stages a product gaseous stream enriched in said component, the improvement wherein, upon reaching a predetermined threshold concentration of a component of said gaseous mixture other than said enriched component in the product gaseous stream withdrawn from an adsorption bed during adsorption, the product gaseous stream is introduced into a gas diffusion zone, thereby forming a permeate stream and a nonpermeate stream in one of which said enriched component is further enriched relative to said product stream, and recovering said further enriched stream.

15. The process as defined in claim 14, wherein said gaseous stream further enriched in said enriched component recovered from said gas diffusion zone is the nonpermeate gaseous stream therefrom.

16. The process as defined in claim 15, further including the step of recovering the permeate gaseous stream from said gas diffusion zone and introducing said stream into an adsorption bed during desorption thereof.

17. The process as defined in claim 16, wherein said permeate gaseous stream is introduced into an adsorption bed after venting thereof.

18. The process as defined in claim 17, wherein said permeate stream is introduced prior to pressure equalization of said adsorption bed with another adsorption bed.

19. In an assembly for effecting pressure swing adsorption techniques for selective enrichment of a component of a gaseous mixture and including at least two adsorption vessels having beds of adsorption material, the improvement wherein said assembly additionally includes a gaseous diffusion cell in direct fluid communication with said adsorption vessels to receive a gaseous stream withdrawn from said adsorption vessels to receive a gaseous stream withdrawn from said adsorption vessel during desorption of said bed of adsorption material therein and a second diffusion cell in fluid communication with said adsorption vessels to receive a gaseous stream enriched in said component withdrawn from said vessels during adsorption of other components of said mixture therein.

20. The assembly as defined in claim 19, wherein a permeate stream is formed in said second gaseous diffusion cell, the assembly further including conduit means for passing said permeate stream to an adsorption vessel during desorption of the bed of adsorption material therein.

* * * * *